(12) United States Patent
Winningham (10) Patent No.: US 6,563,996 B1
(45) Date of Patent: May 13, 2003

(54) OPTICAL FIBERS PREPARED WITH A PRIMARY COATING COMPOSITION INCLUDING A MONOMER WITH A PENDANT HYDROXYL FUNCTIONAL GROUP

(75) Inventor: Michael J. Winningham, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/712,565

(22) Filed: Nov. 14, 2000

Related U.S. Application Data
(60) Provisional application No. 60/174,008, filed on Dec. 30, 1999.

(51) Int. Cl.$^7$ .............................. G02B 6/02; G02B 6/16
(52) U.S. Cl. ...................................... 385/128; 385/123
(58) Field of Search ................................. 385/123–128

(56) References Cited

U.S. PATENT DOCUMENTS

| | | | |
|---|---|---|---|
| 4,474,830 A | 10/1984 | Taylor | 427/54.1 |
| 4,486,212 A | 12/1984 | Berkey | 65/2 |
| 4,581,165 A | 4/1986 | Frank et al. | 260/112.5 |
| 4,608,409 A | 8/1986 | Coady et al. | 524/199 |
| 4,609,718 A | 9/1986 | Bishop et al. | 528/49 |
| 4,624,994 A | 11/1986 | Ansel | 525/440 |
| 4,629,287 A | 12/1986 | Bishop | 350/96.34 |
| 4,682,851 A | 7/1987 | Ansel | 350/96.34 |
| 4,690,502 A | 9/1987 | Zimmerman et al. | 350/96.29 |
| 4,752,112 A | 6/1988 | Mayr | 350/96.23 |
| 4,798,852 A | 1/1989 | Zimmerman et al. | 522/96 |
| 4,851,165 A | 7/1989 | Rennell et al. | 264/1.5 |
| 4,962,992 A | 10/1990 | Chapin et al. | 350/96.23 |
| 4,973,611 A | 11/1990 | Puder | 522/42 |
| 5,104,433 A | 4/1992 | Chapin et al. | 65/3.1 |
| 5,456,984 A | 10/1995 | Bishop et al. | 428/373 |
| 5,486,378 A | 1/1996 | Oestreich et al. | 427/163.2 |
| 5,578,693 A | 11/1996 | Hagstrom et al. | 528/75 |
| 5,703,141 A | 12/1997 | Jin | 522/97 |
| 5,881,194 A | 3/1999 | Duecker | 385/115 |
| 6,014,488 A | 1/2000 | Shustack | 385/128 |
| 6,136,880 A | * 10/2000 | Snowwhite et al. | 522/64 |

FOREIGN PATENT DOCUMENTS

| | | | |
|---|---|---|---|
| EP | 0 407 004 A2 | 1/1991 | C08F/299/06 |
| WO | WO 96/11217 | 4/1996 | |
| WO | WO 97/16469 | 5/1997 | C08G/18/81 |
| WO | WO 98/33081 | 7/1998 | G02B/6/02 |
| WO | WO 99/08975 | 2/1999 | C03C/25/02 |
| WO | WO 99/18043 | 4/1999 | C03C/25/02 |

OTHER PUBLICATIONS

J. E. Midwinter, "Optical Fibers for Transmission", New York, John Wiley, pp. 166–178 (1979).

M.G. Blankenship and C.W. Deneka, "The Outside Vapor Deposition Method of Fabricating Optical Waveguide Fibers", IEEE J. Quantum Electron., 18:1418–1423 (1982) Oct.

K. Inada, "Recent Progress in Fiber Fabrication Techniques by Vapor–Phase Axial Deposition", IEEE J. Quantum Electron., 18:1424–1431 (1982) Oct.

(List continued on next page.)

*Primary Examiner*—John D. Lee
*Assistant Examiner*—Sarah U Song
(74) *Attorney, Agent, or Firm*—Timothy R. Krogh; James V. Suggs (57) ABSTRACT

The present invention relates to an optical fiber including a glass fiber and a primary coating encapsulating and in contact with the glass fiber, the primary coating being the cured product of a polyrnerizable composition which includes a monomer with a pendant hydroxyl functional group which can bond with a surface of the optical fiber and is present in an amount effective to promote adhesion. The present invention also relates to methods of making such optical fibers.

52 Claims, 1 Drawing Sheet

OTHER PUBLICATIONS

S.R. Nagel, J.B. MacChesney and K.L. Walker, "An Overview of the Modified Chemical Vapor Deposition (MCVD) Process and Performance", IEEE Quantum Electron., 18:459–476 (1982) Apr.

English abstract of Application JP 98–288127 dated Oct. 9 1998, from SciFinder Oct. 24, 2000.

English abstract of Application JP 98–10963 dated Jan. 23, 1998 from SciFinder Oct. 24, 2000.

English abstract of Application JP 96–315538 dated Nov. 12, 1996 from SciFinder Oct. 24, 2000.

English abstract of Application JP 96–295916 dated Oct. 18, 1996 from SciFinder Oct. 24, 2000.

Abstract of article entitled "Microhardness of N–vinylpyrrolidone modified glass–ionomer cements" by Xie et al, J Macromol. Sci., Pure Appl. Chem. (1998) from SciFinder Oct. 24, 2000.

English abstract of Application JP 96–89407 dated Apr. 11, 1996 from SciFinder Oct. 24, 2000.

English abstract of Application JP 96–89897 dated Mar. 21, 1996 from SciFinder Oct. 24, 2000.

English abstract of Application JP 96–187064 dated Jul. 17, 1996 from SciFinder Oct. 24, 2000.

English abstract of Application JP 95–71483 dated Mar. 29, 1995 from SciFinder Oct. 24, 2000.

English abstract of EP 709415 A2 dated Jun. 1, 1996, claiming priority to JP 94–289218 dated Oct. 28, 1994 from SciFinder Oct. 24, 2000.

English abstract of GB 2270916 A dated Mar. 30, 1994 from SciFinder Oct. 24, 2000.

English abstract of Application JP 93–205521 dated Jul. 29, 1993 from SciFinder Oct. 24, 2000.

Abstract of Poly (L,L–lactide) Microspheres by Ring Opening Polymerization, Sosnowski et al, Center of Molecular and Macromolecular Studies, Polish Academy of Sciences, Lodz, Pol. Macromolecules (1996) vol. 29, p. 13 from SciFinder Oct. 24, 2000.

English abstract of Application DC 93–4302327 dated Jan. 28, 1993 from SciFinder Oct. 24, 2000.

English abstract of EP 578088 A2 dated Jan. 12, 1994 claiming priority to DE 92–4222516 dated Jul. 9, 1992 from SciFinder Oct. 24, 2000.

English abstract of US 5183831 A dated Feb. 2, 1993 from SciFinder Oct. 24, 2000.

Abstract of article entitled "Bacterial adhesion to poly(HEMA)–based hydrogels" by Cook et al., J. BIomed. Mater. Res. (1993), vol. 27(1), pp. 119–126 from SciFinder Oct. 24, 2000.

Abstract of article entitled "The application of synthetic hydrogels for cell culture" by Nagaoka et al, High Perform. Biomater. (1991) 163–9 from SciFinder Oct. 24, 2000.

English abstract of Application JP 90–99997 dated Apr. 16, 1990 from SciFinder Oct. 24, 2000.

English abstract of Application JP 88–283559 dated Nov. 11, 1998 from SciFinder Oct. 24, 2000.

English abstract of Application JP 88–272776 dated Oct. 28, 1988 from SciFinder Oct. 24, 2000.

English abstract of US 4874799 A dated Oct. 17, 1989 from SciFinder Oct. 24, 2000.

English abstract of Application JP 86–134983 dated Jun. 12, 1986 from SciFinder Oct. 24, 2000.

English abstract of Application JP 87–142183 dated Jun. 9, 1987 from SciFinder Oct. 24, 2000.

English abstract of Application JP 87–164093 dated Jul. 2, 1987 from SciFinder Oct. 24, 2000.

English abstract of EP 243802 A2 dated Nov. 4, 1987 from SciFinder Oct. 24, 2000.

Abstract of article entitled "IPN coatings and films" by Frisch et al, Polym. Mater. Sci. Eng. (1987), vol. 57, pp. 222–230 from SciFinder Oct. 24, 2000.

English abstract of Application JP 85–150082 dated Jul. 10, 1985 from SciFinder Oct. 24, 2000.

Abstract of article entitled "Urethane acrylic interpenetrating polymer networks (IPNs) for coating applications" by Tehranisa, et al, J. Coat. Technol. (1987), vol. 59, pp. 43–49 from SciFinder Oct. 24, 2000.

English abstract of Application JP 85–73321 dated Apr. 6, 1985 from SciFinder Oct. 24, 2000.

English abstract of Application JP 84–264533 dated Dec. 17, 1984 from SciFinder Oct. 24, 2000.

English abstract of Application JP 84–114140 dated Jun. 4, 1984 from SciFinder Oct. 24, 2000.

Abstract of article entitled "Solute and penetrant diffusion in swellable polymers. III. Drug release from glassy poly(HEMA–co–NVP) copolymers" by Korsmeyer et al, J. Controlled Release (1984), vol. 1(2), pp. 89–98 from SciFinder Oct. 24, 2000.

English abstract of Application JP 83–79263 dated May 9, 1983 from SciFinder Oct. 24, 2000.

English abstract of EP 17916 dated Oct. 29, 1980 from SciFinder Oct. 24, 2000.

English abstract of Application: NL 77–6283 dated Jun. 8, 1977 from SciFinder Oct 24, 2000.

English abstract of Application GB 19711209 from SciFinder Oct. 24, 2000.

English abstract of DE 2260211 dated Jun. 28, 1973 from SciFinder Oct. 24, 2000.

English abstract of GB 71–57175 dated Dec. 9, 1971 from SciFinder Oct. 24, 2000.

English abstract of US 19700129–19700902 from SciFinder Oct. 24, 2000.

English abstract of article entitled "Polyurethane–acrylic coatings–interpenetration polymer networks", Xiao et al, Polym. Mater. Sci. Eng. (1987) vol. 56, pp. 546–550 from SciFinder Oct. 24, 2000.

\* cited by examiner

FIG. 1

OPTICAL FIBERS PREPARED WITH A PRIMARY COATING COMPOSITION INCLUDING A MONOMER WITH A PENDANT HYDROXYL FUNCTIONAL GROUP

CROSS-REFERENCE TO RELATED APPLICATIONS

This application claims the benefit of U.S. Provisional Patent Application Serial No. 60/174,008 filed on Dec. 30, 1999, the content of which is relied upon and incorporated herein by reference in its entirety, and the benefit of priority under 35 U.S.C. §120 is hereby claimed.

FIELD OF THE INVENTION

The present invention relates to optical fibers prepared with a primary coating composition including a monomer with a pendant hydroxyl functional group and a method of making optical fibers that contain such coatings.

BACKGROUND OF THE INVENTION

Optical fibers have acquired an increasingly important role in the field of communications, frequently replacing existing copper wires. This trend has had a significant impact in the local area networks (i.e., for fiber-to-home uses), which have seen a vast increase in the usage of optical fibers. Further increases in the use of optical fibers in local loop telephone and cable TV service are expected, as local fiber networks are established to deliver ever greater volumes of information in the form of data, audio, and video signals to residential and commercial users. In addition, use of optical fibers in home and commercial business for internal data, voice, and video communications has begun and is expected to increase.

The fibers used in local networks are directly exposed to harsh conditions, including severe temperature and humidity extremes. Since prior coatings for optical fibers did not perform well under such adverse conditions, the need existed for the development of higher performance coatings to address the wide and varied temperature and humidity conditions in which fibers are employed. Specifically, these coatings possessed thermal, oxidative, and hydrolytic stability which is sufficient to protect the encapsulated fiber over a long life-span (i.e., about twenty-five or more years).

Optical fibers typically contain a glass core, a cladding, and at least two coatings, i.e., a primary (or inner) coating and a secondary (or outer) coating. The primary coating is applied directly to the cladding and, when cured, forms a soft, elastic, and compliant material which encapsulates the glass fiber. The primary coating serves as a buffer to cushion and protect the glass fiber core when the fiber is bent, cabled, or spooled. Stresses placed upon the optical fiber during handling may induce microbending of the fibers and cause attenuation of the light which is intended to pass through them, resulting in inefficient signal transmission. The secondary coating is applied over the primary coating and functions as a tough, protective outer layer that prevents damage to the glass fiber during processing and use.

Certain characteristics are desirable for the primary coating, and others for the secondary coating. The modulus of the primary coating must be sufficiently low to cushion and protect the fiber by readily relieving stresses on the fiber, which can induce microbending and consequent inefficient signal transmission. This cushioning effect must be maintained throughout the fiber's lifetime.

Because of differential thermal expansion properties between the primary and secondary coatings, the primary coating must also have a glass transition temperature ($T_g$) which is lower than the foreseeable lowest use temperature. This enables the primary coating to remain soft throughout the temperature range of use, facilitating differences in the coefficient of thermal expansion between the glass fiber and the secondary coating.

It is important for the primary coating to have a refractive index which is different (i.e., higher) than the refractive index of the cladding. This refractive index differential between the cladding and the primary coating allows errant light signals to be refracted away from the glass core.

Finally, the primary coating must maintain adequate adhesion to the glass fiber during thermal and hydrolytic aging, yet be strippable therefrom for splicing purposes. Moisture resistance is essential, because moisture also affects the adhesion of the primary coating to the glass. Poor adhesion can result in various sized delaminations which may lead to microbending and which can be significant sources of attenuation in the optical fiber.

Therefore, the need remains for improved coating compositions for glass fibers. The present invention is directed to overcoming this deficiency in the art.

SUMMARY OF THE INVENTION

One aspect of the invention relates to an optical fiber which includes a glass fiber and a primary coating encapsulating and in contact with the glass fiber. This primary coating is the cured product of a polymerizable composition that includes a monomer with a pendant hydroxyl functional group which can bond with a surface of the glass fiber and is present in an amount effective to promote adhesion.

Another aspect of the invention relates to a method of making an optical fiber in accordance with the present invention. This method involves providing a glass fiber, coating the glass fiber with a polymerizable primary coating composition that includes a monomer with a pendant hydroxyl functional group which can bond with a surface of the glass fiber and is present in an amount effective to promote adhesion, and polymerizing the composition under conditions effective to form a primary coating over the glass fiber.

By employing a primary coating composition of the present invention, it is possible to enhance the adhesive property of the primary coating on an optical fiber, thereby increasing pullout values. As a result, the occurrence of delaminations can be reduced or eliminated. Further, the useful life of optical fibers can be enhanced and the quality of signal transmission (i.e., minimal attenuation) over the lifetime of the optical fiber can be maintained.

DETAILED DESCRIPTION OF THE INVENTION

One aspect of the invention relates to an optical fiber which includes a glass fiber and a primary coating encapsulating and in contact with the glass fiber. This primary coating is the cured product of a polymerizable composition that includes a monomer with a pendant hydroxyl functional group which can bond with a surface of the glass fiber and is present in an amount effective to promote adhesion.

Figure 1:
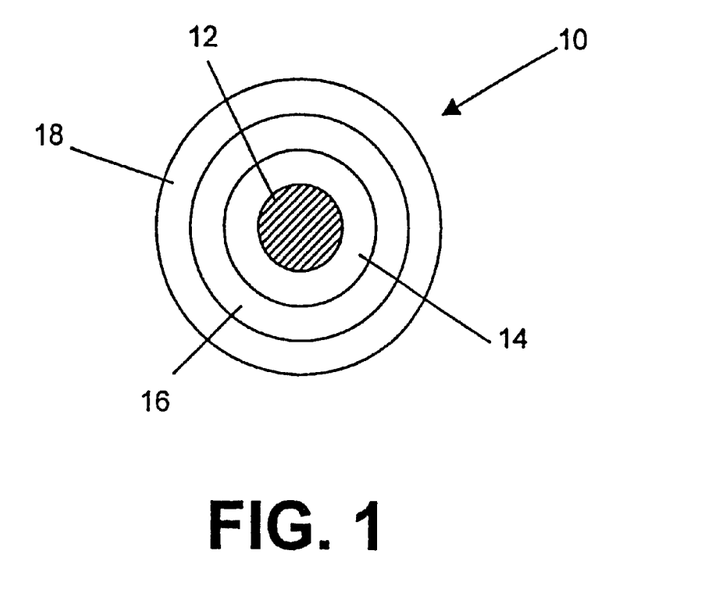
FIG. 1 is a cross-sectional view of an optical fiber of the present invention.

Referring to FIG. 1, the optical fiber 10 includes a glass core 12, a cladding layer 14 surrounding and adjacent to the glass core 12, a primary coating material 16 which adheres to the cladding layer 14, and one or more secondary (or outer) coating materials 18 surrounding and adjacent to the primary coating material 16.

As used herein, a pendant hydroxyl functional group is a hydroxyl functional group located at the end of a chain in a composition.

Also as used herein, (meth)acrylate is used to mean acrylate or methacrylate.

In a preferred embodiment, the monomer with a pendant hydroxyl functional group which can bond with a surface of the glass fiber is a primary single hydroxyl-containing monomer, a secondary/aromatic single hydroxyl-containing monomer, or a multiple hydroxyl-containing monomer. Suitable primary single hydroxyl-containing monomers include caprolactone (meth)acrylate (e.g., SR495 available from Sartomer Company, Inc. (West Chester, Pa.), and Tone M100 available from Union Carbide Company (Danbury, Conn.)), 4-hydroxybutyl(meth)acrylate (1,4-butanediol mono(meth)acrylate) (all remaining monomers available from Monomer-Polymer & Dajac Labs, Inc. (Feasterville, Pa.)), diethylene glycol mono(meth)acrylate, ethylene glycol mono(meth)acrylate (hydroxyethyl(meth)acrylate), hydroxymethyl styrene, polyethylene glycol mono(meth)acrylate (MW 200–10,000), polypropylene glycol mono (meth)acrylate, and polytetramethylene glycol mono(meth)acrylate. Suitable secondary/aromatic single hydroxyl-containing monomers include 2-hydroxypropyl (meth)acrylate and 4-hydroxystyrene. Suitable multiple hydroxyl-containing monomers include hydroxyethyl cellulose(meth)acrylate and sorbitol (meth)acrylate. Most preferably, the monomer with a pendant hydroxyl functional group is caprolactone acrylate, as shown below in Formula I:

As used herein, the weight percent of a particular component refers to the amount introduced into the bulk composition excluding an additional adhesion promoter and other additives. The amount of additional adhesion promoter and various other additives that are introduced into the bulk composition to produce a composition of the present invention is listed in parts per hundred. For example, a monomer with a pendant hydroxyl functional group, an oligomer, and photoinitiator are combined to form the bulk composition such that the total weight percent of these components equals 100 percent. To this bulk composition, an amount of an additional adhesion promoter other than the monomer with a pendant hydroxyl functional group, for example 1.0 part per hundred, can be employed in excess of the 100 weight percent of the bulk composition to improve adhesion in more severe (e.g. wet) environments.

Preferably, the monomer with a pendant hydroxyl functional group is present in the composition in an amount of about 5 to 90 percent by weight, more preferably, about 10 to 40 percent by weight, and most preferably, about 20 to 30 percent by weight.

Typically, a major component of the coating composition of the present invention is an oligomer. Preferably the oligomer is an ethylenically unsaturated oligomer, more preferably a (meth)acrylate oligomer. The (meth)acrylate terminal groups in such oligomers may be provided by a monohydric poly(meth)acrylate capping component, or by a mono(meth)acrylate capping component such as 2-hydroxyethyl acrylate, in the known manner.

Urethane oligomers are conventionally provided by reacting an aliphatic or aromatic diisocyanate with a dihydric polyether or polyester, most typically a polyoxyalkylene glycol such as a polyethylene glycol. Such oligomers typically have 4–10 urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., which are hereby incorporated by reference, describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from 2–250 carbon atoms and, preferably, are substantially free of ether or ester groups. The ranges of oligomer viscosity and molecular weight obtainable in these systems are similar to those obtainable in unsaturated, polar oligomer systems, such that the viscosity and coating characteristics thereof can be kept substantially unchanged. The reduced oxygen content of these coatings has been found not to unacceptably degrade the adherence characteristics of the coatings to the surfaces of the glass fibers being coated.

As is well known, polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently non-polar and saturated as to avoid compromising the moisture resistance of the system.

Thus, it is desirable for the coating composition of the present invention to contain at least one ethylenically unsaturated oligomer, although more than one oligomer component can be introduced into the composition. Preferably, the oligomer(s) is present in the coating composition in an amount between about 10 to about 90 percent by weight, more preferably between about 35 to about 75 percent by weight, and most preferably between about 40 to about 65 percent by weight.

Suitable ethylenically unsaturated oligomers are polyether urethane acrylate oligomers (e.g., CN986 available from Sartomer Company, Inc., (West Chester, Pa.), BR3731 and STC3-149 available from Bomar Specialties Co. (Winsted, Conn.), and purelast 566A (available from Polymer Systems Co., Orlando, Fla.), polyester urethane acrylate oligomers (e.g., CN966 and CN973 available from Sartomer Company, Inc. and BR7432 available from Bomar Specialty Co.), polyurea urethane acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., which are hereby incorporated by reference), polyether acrylate oligomers (e.g., Genomer 3456 available from Rahn AG (Zurich, Switzerland), polyester acrylate oligomers (e.g., Ebecryl 80, 584, and 657 available from UCB Radcure (Atlanta, Ga.)), polyurea acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., all of which are hereby incorporated by reference), epoxy acrylate oligomers (e.g., CN120 available from Sartomer Company, Inc., and Ebecryl 3201 and 3204 available from UCB Radcure), hydrogenated polybutadiene oligomers (e.g., Echo Resin MBNX available from Echo Resins and Laboratory (Versailles, Mo.)), and combinations thereof.

The primary coating compositions of the invention may also comprise, in addition to the monomer with a pendant hydroxyl functional group which can bond with a surface of the optical fiber and the oligomer component, a co-monomer component. Preferably, the co-monomer is an ethylenically unsaturated monomer, more preferably a (meth)acrylate monomer. Generally, suitable monomers are those for which the resulting homopolymer would have a glass transition temperature ($T_g$) of at most about 20° C., preferably at most about 10° C. Preferably, the mixture of monomer with a pendant hydroxyl functional group and co-monomer has a net $T_g$ of at most about 20° C., most preferably at most about 10° C. Generally, a lower molecular weight (i.e., about 120 to 600) liquid (meth)acrylate-functional monomer is added to the formulation to provide the liquidity needed to apply the coating composition with conventional liquid coating equipment. Typical acrylate-functional liquids in these systems include monofunctional and polyfunctional acrylates (i.e., monomers having two or more acrylate functional groups). Illustrative of these polyfunctional acrylates are the difunctional acrylates, which have two functional groups; the trifunctional acrylates, which have three functional groups; and the tetrafunctional acrylates, which have four functional groups. Monofunctional and polyfunctional methacrylates may also be employed.

When it is desirable to utilize moisture-resistant components, the co-monomer component will be selected on the basis of its compatibility with the selected moisture-resistant oligomer. Not all such liquid monomers may be successfully blended and co-polymerized with the moisture-resistant oligomers, because such oligomers are highly nonpolar. For satisfactory coating compatibility and moisture resistance, it is desirable to use a liquid acrylate monomer component comprising a predominantly saturated aliphatic mono- or di-acrylate monomer or alkoxy acrylate monomers.

Thus, it is desirable for the composition to contain at least one ethylenically unsaturated co-monomer, although more than one co-monomer can be introduced into the composition. Preferably, the ethylenically unsaturated co-monomer is present in the composition in an amount between about 10 to about 90 percent by weight, more preferably between about 20 to about 60 percent by weight, and most preferably between about 25 to about 45 percent by weight.

Suitable ethylenically unsaturated co-monomers include aliphatic monomers, aromatic monomers, and polar monomers. Suitable aliphatic monomers include lauryl(meth) acrylate (e.g., SR335 available from Sartomer Company, Inc., Ageflex FA12 available from CPS Chemical Co. (Old Bridge, N.J.), and Photomer 4812 available from Henkel (Ambler, Pa.)), isooctyl(meth)acrylate (e.g., SR440 available from Sartomer Company, Inc. and Ageflex FA8 available from CPS Chemical Co.), tridecyl(meth)acrylate (e.g., SR489 available from Sartomer Company, Inc.), isobornyl (meth)acrylate (e.g., SR506 available from Sartomer Company, Inc. and Ageflex IBOA available from CPS Chemical Co.), stearyl(meth)acrylate (e.g., SR257 available from Sartomer Company, Inc.), and isodecyl(meth)acrylate (e.g., SR395 available from Sartomer Company, Inc. and Ageflex FA10 available from CPS Chemical Co.). Suitable aromatic monomers include ethoxylatednonylphenol(meth) acrylate (e.g., SR504 available from Sartomer Company, Inc. and Photomer 4003 available from Henkel), propoxylatednonylphenol(meth)acrylate, phenoxyethyl (meth)acrylate (e.g., SR339 available from Sartomer Company, Inc., Ageflex PEA available from CPS Chemical Co., and Photomer 4035 available from Henkel), and phenoxyglycidyl(meth)acrylate (e.g., CN131 available from Sartomer Company, Inc.). Suitable polar monomers include tetrahydrofurfuryl(meth)acrylate (e.g., SR285 available from Sartomer Company, Inc.), 2-(2-ethoxyethoxy)ethyl (meth)acrylate (e.g., SR256 available from Sartomer Company, Inc.), and aliphaticoxyglycidyl(meth)acrylate (available from Sartomer Company, Inc.). Also suitable are combinations of the above co-monomers.

As is well known, optical fiber coating compositions may also contain a polymerization initiator which is suitable to cause polymerization (i.e., curing) of the composition after its application to a glass fiber. Polymerization initiators suitable for use in the primary coating compositions of the present invention include thermal initiators, chemical initiators, electron beam initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes between about 0.1 to about 10.0 percent by weight, more preferably between about 0.5 to about 7.5 percent by weight, most preferably between about 1.0 to about 4.0 percent by weight.

The photoinitiator, when used in a small but effective amount to promote radiation cure, must provide reasonable cure speed without causing premature gelation of the coating composition. A desirable cure speed is any speed sufficient to cause substantial curing of the coating materials. A cure speed for coating thicknesses of about 25–35 $\mu$m is, e.g., less than 1.0 J/cm$^2$, preferably less than 0.5 j/cm$^2$.

Suitable photoinitiators include 1-hydroxycyclohexylphenyl ketone (e.g., Irgacure 184 available from Ciba Specialty Chemical (Hawthorne, N.Y.)), (2,6-dimethoxybenzoyl)-2,4,4-trimethylpentyl phosphine oxide (e.g., commercial blends Irgacure 1800, 1850, and 1700 available from Ciba Specialty Chemical), 2,2-dimethoxy-2-phenyl acetophenone (e.g., Irgacure 651, available from Ciba Specialty Chemical), and combinations thereof.

Preferably, an adhesion promoter, other than the monomer with a pendant hydroxyl functional group, is present in the coating composition. In a preferred embodiment, an adhesion promoter is present in the composition in an amount between about 0.1 to about 10 parts per hundred, more preferably between about 0.25 to about 4 parts per hundred, most preferably between about 0.5 to about 3 parts per hundred. Suitable adhesion promoters include alkoxysilanes, organotitanates, and zirconates. Preferred adhesion promoters include 3-mercaptopropyltrialkoxysilane (available from United Chemical Technologies (Bristol, Pa.)), bis(trialkoxysilylethyl)benzene, acryloxypropyltrialkoxysilane, methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl) benzene (available from Gelest (Tullytown, Pa.)); see U.S. patent application Ser. No. 09/301,814, filed Apr. 29, 1999, which is hereby incorporated by reference).

In addition to the above-described components, the primary coating composition of the present invention can optionally include any number of additives, such as reactive diluents, antioxidants, catalysts, and other stabilizers and property-enhancing additives. Some additives can operate to control the polymerization process, thereby affecting the physical properties (e.g., modulus, glass transition temperature) of the polymerization product formed from the primary coating composition. Others can affect the integrity of the polymerization product of the primary coating composition (e.g., protect against de-polymerization or oxidative degradation).

A preferred catalyst is a tin-catalyst, which is used to catalyze the formation of urethane bonds in some oligomer components. Whether the catalyst remains as an additive of the oligomer component or additional quantities of the catalyst are introduced into the composition of the present invention, the presence of the catalyst can act to stabilize the oligomer component in the composition.

A preferred antioxidant is thiodiethylene bis(3,5-di-tert-butyl)-4-hydroxyhydrocinnamate (e.g., Irganox 1035, available from Ciba Specialty Chemical).

It has recently been discovered that optical fiber coating systems with low pullout values have tendencies toward delamination and in some cases "spontaneous" delamination, where the fibers undergo delamination prior to handling. This was most severe when the secondary coating modulus was high. The pullout test correlates to dry adhesion of the primary coating to the glass surface. The fiber pullout test can be related to coating adhesion when: (1) the adhesion of the primary coating to the glass surface is less than the tensile strength of the primary coatings; and (2) the primary coating's adhesion is less than the fiber strength (for weakened or damaged fiber). A relatively high degree of shrinkage of the higher modulus secondary coatings may cause the primary coatings, which adhered weakly to the glass surface, to pull away from the glass surface resulting in delaminated fibers. However, for superior protection of the glass fiber from environmental forces, no delamination sites should be present. For instance, a delamination site may act as a receptacle for water if the fiber were to be exposed to high humidity conditions, which may in turn lead to microbending. In addition, if the water were to freeze with a drop in temperature, significant attenuation losses may occur.

The incorporation of a monomer with a pendant hydroxyl functional group which can bond with a surface of the optical fiber to primary coating compositions greatly increased the room temperature (50% relative humidity ("rh")) fiber pullout values. In particular, coated fibers, which had caprolactone acrylate in the primary coating, had higher room temperature (50%rh) pullout values than related fibers without the monomer. Fibers coated with these primary coatings and various moduli secondary coatings also were found to have superior resistance toward glass/primary delamination. Previous work has shown that changes in monofunctional monomers in primary coatings can be made without greatly altering the mechanical properties of the coatings. This allows the formulator to tune other properties without significantly affecting modulus or tensile elongation.

Referring to FIG. 1, the optical fiber 10 includes a glass core 12, a cladding layer 14 surrounding and adjacent to the glass core 12, a primary coating material 16 which adheres to the cladding layer 14, and one or more secondary (or outer) coating materials 18 surrounding and adjacent to the primary coating material 16. Any conventional material can be used to form the glass core 12, such as those described in U.S. Pat. No. 4,486,212 to Berkey, which is hereby incorporated by reference. The core is typically a silica glass having a cylindrical cross section and a diameter ranging from about 5 to about 10 µm for single-mode fibers and about 20 to about 100 µm for multi-mode fibers. The core can optionally contain varying amounts of other material such as, e.g., oxides of titanium, thallium, germanium, and boron, which modify the core's refractive index. Other dopants which are known in the art can also be added to the glass core to modify its properties.

The cladding layer 14 preferably has a refractive index which is less than the refractive index of the core. A variety of cladding materials, both plastic and glass (e.g., silicate and borosilicate glasses) are used in constructing conventional glass fibers. Any conventional cladding materials known in the art can be used to form the cladding layer 14 in the optical fiber of the present invention.

The glass core 12 and cladding layer 14, which together form the glass fiber, can be formed according to a number of processes known in the art. In many applications, the glass core 12 and cladding layer 14 have a discernable core-cladding boundary. Alternatively, the core and cladding layer can lack a distinct boundary. The optical fibers of the present invention can contain these or any other conventional core-cladding layer configuration now known or hereafter developed.

The advantages of the primary coating composition of the present invention are due fundamentally to an interaction of the monomer with a pendant functional group and a surface of the optical fiber. While not wishing to be bound by theory, it is believed that the monomers have the ability to form relatively strong secondary bond associations/interactions with the glass surface of the optical fiber, but not so strong that they prevent the fiber coating from being stripped using conventional techniques.

The secondary coating material(s) 18 is typically the polymerization (i.e., cured) product of a coating composition that contains urethane acrylate liquids whose molecules become cross-linked when polymerized. Other suitable materials for use in secondary coating materials, as well as considerations related to selection of these materials, are well known in the art and are described in U.S. Pat. Nos. 4,962,992 and 5,104,433 to Chapin, which are hereby incorporated by reference. Various additives that enhance one or more properties of the coating can also be present, including the above-mentioned additives incorporated in the compositions of the present invention.

The secondary coating materials 18 can be a tight buffer coating or, alternatively, a loose tube coating. Irrespective of the type of secondary coating employed, it is preferred that the outer surface of the secondary coating material 18 not be tacky so that adjacent convolutions of the optic fiber (i.e., on a process spool) can be unwound.

The components of the optical fiber of the present invention can optionally include a coloring material, such as a pigment or dye, or an additional colored ink coating.

The optical fibers of the present invention can also be formed into a optical fiber ribbon which contains a plurality of substantially aligned, substantially coplanar optic fibers encapsulated by a matrix material. The matrix material can be made of a single layer or of a composite construction. Suitable matrix materials include polyvinyl chloride as well as those materials known to be useful as secondary coating materials. Preferably the matrix material is the polymerization product of the composition used to form the secondary coating material.

Because of the advantages offered by use of the monomer with a pendant functional group which can bond with a glass surface of the optical fiber, it is possible to produce optical fibers which exhibit few micro-delaminations (measured in a fiber aged at least 14 days at 23° C. and 50% rh) between the primary coating and the glass fiber after handling, preferably fewer than 10 per decimeter of the optical fiber and more preferably fewer than 10 per meter. Even more preferred optical fibers, which contain the primary coating prepared from the preferred compositions of the present invention, are capable of exhibiting no micro-delaminations after handling.

Another aspect of the present invention relates to a method of making an optical fiber of the present invention. Basically, this method can be effected by standard methods with the use of a primary coating composition of the present invention.

Briefly, the process involves providing the glass fiber (core 12 and cladding layer 14), coating the glass fiber with the primary coating composition of the present invention, and polymerizing the composition to form the primary coating material 16. Optionally, a secondary coating composition can be applied to the coated fiber either before or after polymerizing the primary coating. When applied after polymerizing the primary coating, a second polymerization step must be employed.

The core and cladding layer are typically produced in a single operation by methods which are well known in the art. Suitable methods include: the double crucible method as described, for example, in Midwinter, *Optical Fibers for Transmission*, New York, John Wiley, pp. 166–178 (1979), which is hereby incorporated by reference; rod-in-tube procedures; and doped deposited silica processes, also commonly referred to as chemical vapor deposition ("CVD") or vapor phase oxidation. A variety of CVD processes are known and are suitable for producing the core and cladding layer used in the optical fibers of the present invention. They include external CVD processes (Blankenship et al., "The Outside Vapor Deposition Method of Fabricating Optical Waveguide Fibers," *IEEE J. Quantum Electron.*, 18:1418–1423 (1982), which is hereby incorporated by reference), axial vapor deposition processes (Inada, "Recent Progress in Fiber Fabrication Techniques by Vapor-phase Axial Deposition," *IEEE J. Quantum Electron.* 18:1424–1431 (1982), which is hereby incorporated by reference), and modified CVD or inside vapor deposition (Nagel et al., "An Overview of the Modified Chemical Vapor Deposition (MCVD) Process and Performance," *IEEE J. Quantum Electron.* 18:459–476 (1982), which is hereby incorporated by reference).

The primary and optional secondary coating compositions are coated on a glass fiber using conventional processes.

It is well known to draw glass fibers from a specially prepared, cylindrical glass perform which has been locally and symmetrically heated to a temperature, e.g., of about 2000° C. As the preform is heated, such as by feeding the preform into and through a furnace, a glass fiber is drawn from the molten material. The primary and optional secondary coating compositions are applied to the glass fiber after it has been drawn from the preform, preferably immediately after cooling. The coating compositions are then cured to produce the coated optical fiber. The method of curing can be thermal, chemical, or radiation induced, such as by exposing the un-cured coating composition on the glass fiber to ultraviolet light or electron beam, depending upon the nature of the coating composition(s) and polymerization initiator being employed. It is frequently advantageous to apply both the primary coating composition and any secondary coating compositions in sequence following the draw process. One method of applying dual layers of coating compositions to a moving glass fiber is disclosed in U.S. Pat. No. 4,474,830 to Taylor, which is hereby incorporated by reference. Another method for applying dual layers of coating compositions onto a glass fiber is disclosed in U.S. Pat. No. 4,851,165 to Rennell et al., which is hereby incorporated by reference. Of course, the primary coating composition can be applied and cured to form the primary coating material 16, then the secondary coating composition(s) can be applied and cured to form the secondary coating material 18.

Coated optical fibers 10 of the present invention can also be used to prepare an optical fiber ribbon using conventional methods of preparation. For example, a plurality of coated optical fibers 10 are substantially aligned in a substantially coplanar relationship to one another and, while remaining in this relationship, the coated optical fibers are coated with a composition that is later cured to form the ribbon matrix material. The composition used to prepare the ribbon matrix material can be the same as the secondary coating composition, or any other suitable composition known in the art. Methods of preparing optical fiber ribbons are described in U.S. Pat. No. 4,752,112 to Mayr and U.S. Pat. No. 5,486,378 to Oestreich et al., which are hereby incorporated by reference.

EXAMPLES

Example 1

Preparation of Coated Fibers

Materials.

All materials were used as received. Monomers used were supplied by Sartomer Company (West Chester, Pa.). The BR3731 and BR7432 oligomers were supplied by Bomar Specialties Company (Winsted, Conn.). The Purelast566A oligomer was supplied by Polymer Systems Corporation (Orlando, Fla.). The photoinitiator (Irgacure 1850) and antioxidant (Irganox 1035) were supplied by Ciba Specialty Chemicals (Hawthorne, N.Y.). The adhesion promoter, 3-mercaptopropyltrimethoxysilane, was supplied by United Chemical Technologies (Bristol, Pa.). The adhesion promoter, bis(trimethoxysilylethyl) benzene was supplied by Gelest (Tullytown, Pa.).

General Formulation Procedure.

Coating formulations were prepared in 5 gallon metal pails, which were coated with a chemical resistant epoxy resin by the manufacturer. Oligomer(s) was combined with the co-monomers, and the mixture was warmed with a heating band wrapped around the pail and stirred with an overhead stirrer. Aluminum foil was used to shield the coating from light. The mixture was stirred at 60 ° C. for 1–2 hours. Photoinitiator (Irgacure 1850, 3 wt. %) and antioxidant (Irganox 1035, 1 pph) solids were then added and the mixture was allowed to stir another 1–2 hours. After the homogeneous mixture cooled to room temperature, silane adhesion promoter (1 pph) was added and the mixture was stirred at room temperature for an additional 1–2 hours.

Fiber Draw Runs.

Once the coating formulations were prepared, primary and secondary coating materials were applied to drawn glass fibers subsequent to cooling. The glass fiber, having a diameter of about 125 µm, was introduced into a container of one of the compositions listed in Tables 1 and 5. As the coated fiber was removed from the container, the thickness of the primary coating composition was adjusted such that the dry film thickness would be about 32.5 µm by passing the coated fiber through a die. The coated fiber was then cured via exposure to ultraviolet radiation. The coated fiber was drawn through a second coating container holding a secondary coating composition. As the coated fiber was removed from the second chamber, the thickness of the secondary coating composition was adjusted such that the dry film thickness would be about 27.5 µm by passing the coated fiber through a die. The coated fiber was then cured with ultraviolet radiation at a dose level of about 0.25 to 1.0 J/cm$^2$ using a D bulb (available from Fusion UV Systems, Inc. (Gaithersburg, Md.)) to produce an optical fiber having a diameter of about 245±10 µm.

Fiber Pullout Tests.

The basic test measures the peak force needed to pull a 1 cm length of glass fiber out of a protective coating (e.g., tab) which is glued to a support surface. The fiber is cut at 1 cm and the coating nicked at the edge of the support surface. The glass fiber is then pulled out of the coating and the peak force is a measure of the coating adhesion to the glass fiber. The pullout tests are based on FOTP-105, Recommended Standard EIA/TIA-455.

More particularly, an Interface load cell (Interface Super-Mini Load Cell, Model SM-10, Scottsdale, Ariz.) was hung from an Instron crosshead (Instron 4202 Universal Tester, 120v. 1440va., Raymond Foster, Canton, Ma.). The Instron was used to pull the glass out of the coating at 5 mm/min. The load cell was connected to a daytronic signal conditioner (Daytronic Model 3570 Signal Conditioner, Miamisburg, Ohio) which was connected to a strip chart recorder (Omegaline Chart Recorder, Stanford, Conn.).

For a 10 lb load cell, the recorder was set at 3 cm/minute and 5 volts range and the Instron was set at 5 mm/minute. The calibration of the load cell was then checked following manufacturer's procedures.

One end of a series of fibers was attached to a substrate (e.g., a glass plate) attached to one pulling device and the other end of the series of fibers was attached to a substrate attached to a second pulling device. The force needed to pull the glass fiber from the coating was measured. In particular, ten five-inch long segments of fiber were cut for each test. A row of ten 1-inch paper tabs was placed along both long sides of black poster board trays. Each fiber was then glued to one of the paper tabs on one side of the tray with Krazy Wood Glue®. This was done by applying approximately a ⅝" long thin layer of glue from the middle of the edge through the middle of the paper tab while holding the edge of the tab down with the thumb and index finger. After waiting at least ½ hour, the other ends were glued to the other row of tabs. Again after waiting until the glue was dry, the first row of tabs was marked with a pen and each fiber was cut at 1 cm from the edge and the coating nicked with a razor blade. The mark was applied to identify which tabs had been cut and nicked. After all ten fibers were glued, cut to length, and nicked, they were left in a temperature and humidity controlled room for at least 2 hours, preferably overnight.

The tabs with the nicks were placed in a top pneumatic grip. A bottom grip was adjusted just below the cut on the bottom tab and the grip was shut, making sure the fiber was in a vertical position (if the fiber is not vertical it will cause the peak force to be measured higher than it actually is). The return position was then set on the Instron console. The recorder and Instron were started and the nick was watched on a TV screen to see when the secondary and primary coatings separated. At this point, the chart trace was marked by switching the range switch. The recorder was run at 3 cm/minute for the first two samples and 1 cm/minute for the other samples.

The pullout test procedure was run until the glass came out of the tab and then the chart was stopped. The peak force was recorded from the Daytronic meter. When the primary separation occurred and if it was a clean pullout was also recorded.

Microscopic Fiber Inspection.

Fibers were mounted in kerosene under a microscope and examined at 200× magnification. Delaminations, which varied in length, were observed as sharp, dark regions located at the primary coating/glass interface.

Resulting Coating Compositions

In Table 1 the compositions of related primary coatings A–E are shown.

TABLE 1

Primary Formulation Compositions for Coatings A–E[a]

| Primary Coating | A | B | C | D | E |
|---|---|---|---|---|---|
| Oligomer(1)-Wt % | BR3731-52% | BR3731-50% | B3731-52% | BR3731-52% | B3731-52% |
| Oligomer(2)-Wt % | | Purelast-566A-15% | | | |
| Monomer-(1)-Wt % | SR504-45% | SR256-32% | SR504-25% | SR504-25% | SR504-25% |
| Monomer-(2)-Wt % | | | S339-20% | CN130-20% | SR495-20% |
| Photoinitiator Wt % | Irgacure 1850-3% | Irgacure 1850-3% | Irgacure 1850-3% | Irgacure 1850-3% | Irgacure 1850-3% |
| Cross-linker-pph | | SR499-7.0 | | | |

All coatings contained 1 pph 3-mercaptopropyltrimethoxysilane adhesion promoter and 1 pph Irganox 1035 antioxidant. BR3731=aliphatic urethane acrylate oligomer; Purelast566A=aliphatic urethane monoacrylate oligomer; SR504=ethoxylatednonylphenol acrylate; SR256=2-(2-ethoxyethoxy)ethyl acrylate; SR339= phenoxyethyl acrylate; CN 130=aliphaticoxyglycidyl acrylate; SR495=caprolactone acrylate; SR499=ethoxylated(6) trimethylolpropane triacrylate; Irgacure 1850=BAPO photoinitiator blend.

The primary coatings all contained the same oligomer, photoinitiator, and antioxidant components (B contained a second oligomer, however) and the concentrations by weight percent were approximately the same for these components. The coatings differed in monomer composition. Only primary coating E contained caprolactone acrylate. Chemical structures of the components are shown below:

SR495—caprolactone acrylate (Formula I):

SR504—ethoxylatednonylphenol acrylate (Formula II):
SR256—2-(2-ethoxyethoxy)ethyl acrylate (Formula III):

SR339—phenoxyethyl acrylate (Formula IV):

SR499—ethoxylated(6)trimethylolpropane triacrylate (Formula V):

Irgacure 1850 (Formula VI):

Irganox 1035 (Formula VII):

3-mercaptopropyltrimethoxysilane (Formula VIII):

Cured film properties, shown in Table 2, were measured to characterize the various primary coatings A–E (see Table 1 for composition data).

TABLE 2

Cured Film Properties of Coatings A–E

| Primary Coating | A | B | C | D | E |
|---|---|---|---|---|---|
| Young's Modulus (MPa) | 0.82 | 1.59 | 1.21 | 1.03 | 1.29 |
| Y.M. stnd dev | 0.03 | 0.05 | 0.07 | 0.05 | 0.07 |
| Tensile Strength (MPa) | 0.63 | 1.39 | 1.06 | 1.16 | 0.82 |
| T. Strength stnd dev | 0.22 | 0.78 | 0.3 | 0.30 | 0.22 |
| % Elongation | 184.16 | 103.32 | 164.07 | 167.94 | 122.75 |
| % E. stnd dev | 45.51 | 23.34 | 40.36 | 27.23 | 32.39 |
| Tg (° C.) | −33.8 | −31.9 | −23.5 | −39.6 | −36.4[a] |

[a]$T_g$'s (glass transition temperatures) were measured by dynamic mechanical analysis at 1 Hz.

The primary coatings did not show gross differences in mechanical properties as measured at 23° C. and 50%rh in the coating lab. The glass transition temperatures, $T_g$'s (peak tan δ as recorded from dynamic mechanical analysis (DMA) curve of films at 1 Hz), were not found to be drastically different. Thermal stabilities were found to be quite similar for coatings A–E. Although film properties were found to be fairly similar for these coatings, the fiber performance for these primary coatings were quite different.

Example 2

Evaluation of Fiber Pullout Values

The fiber pullout test can be related to dry adhesion of the primary coating to the glass surface. The fiber pullout test can be related to coating adhesion when: 1) the adhesion of the primary coating to the glass surface is less than the tensile strength of the primary coating; 2) the primary coating adhesion is less than the fiber strength (for weakened, or damaged fiber).

Fibers with various primary coatings A, B, C, and D are listed along with their fiber pullout values in Table 3.

TABLE 3

Properties of Fibers without Caprolactone Acrylate in Primary Coatings

| Fiber # | 1 | 2 | 3 | 4 | 5 |
|---|---|---|---|---|---|
| Primary Coating | A | A | B | C | D |
| Primary Monomers[a] | SR504 | SR504 | SR256; SR499 | SR504; SR339 | SR504; CN130 |
| Secondary Coating Young's Modulus (MPa) | 402 | 512 | 1446 | 1692 | 402 |
| 50% Rh Pullout Force (lbf) | 0.95 | ND[b] | 0.97 | 1.29 | 0.77 |
| 95% CL Delaminations? | 0.14 No | ND[b] Yes | 0.07 Yes (after water soak) | 0.06 Yes | 0.08 No |

[a]SR504 = ethoxylatednonylphenol acrylate; SR256 = 2-(2-ethoxyethoxy) ethyl acrylate; SR339 = phenoxyethyl acrylate; CN130 = aliphaticoxyglycidyl acrylate; SR499 ethoxylated(6)trimethylolpropane triacrylate.
[b]ND = no data collected.

The formulations for the secondary coatings are set forth in Tables 4–8, below.

TABLE 4

Secondary Coating Found in Fibers 1, 5, 6, and 9–11

| Component | Trade-name | Company | Description | Wt % or pph |
|---|---|---|---|---|
| Oligomer | BR571 | Bomar | Urethane acrylate oligomer | 22% |
| Oligomer | CN983 | Sartomer | Urethane acrylate oligomer | 30% |
| Difunctional monomer | SR344 | Sartomer | Polyethylene glycol (400) Diacrylate | 16% |
| Difunctional monomer | SR602 | Sartomer | Ethoxylated bisphenol A Diacrylate | 14% |
| Trifunctional monomer | SR9020 | Sartomer | Propoxylated glycerol triacrylate | 14% |
| Photoinitiator | Irgacure 1850 | Ciba Specialty Chemicals | BAPO photoinitiator blend | 3% |
| Photoinitiator | Irgacure 651 | Ciba Specialty Chemicals | Benzil dimethyl ketal | 1% |
| Antioxidant | Irganox 1035 | Ciba Specialty Chemicals | Hindered phenol | 0.5 pph |

TABLE 5

Secondary Coating Found in Fiber 2

| Component | Trade-name | Company | Description | Wt % or pph |
|---|---|---|---|---|
| Oligomer | BR3731 | Bomar | Urethane | 30% |
| Oligomer | BR301 | Bomar | Urethane acrylate oligomer | 10% |
| Difunctional monomer | SR349 | Sartomer | Ethoxylated bisphenol A diacrylate | 16% |
| Trifunctional monomer | SR9020 | Sartomer | Propoxylated glycerol triacrylate | 21% |
| Tetrafunctional monomer | SR494 | Sartomer | Ethoxylated pentaerythritol tetraacrylate | 20% |
| Photoinitiator | Irgacure 1850 | Ciba Specialty Chemicals | BAPO photoinitiator blend | 3% |

TABLE 6

Secondary Coating Found in Fiber 3

| Component | Trade-name | Company | Description | Wt % or pph |
|---|---|---|---|---|
| Oligomer | STC3-122 | Bomar | Urethane acrylate oligomer | 50% |
| Oligomer | BR571 | Bomar | Urethane acrylate oligomer | 16% |
| Difunctional monomer | SR268 | Sartomer | Tetraethylene glycol diacrylate | 7% |
| Trifunctional monomer | SR9020 | Sartomer | Propoxylated glycerol triacrylate | 24% |
| Photoinitiator | Irgacure 1850 | Ciba Specialty Chemicals | BAPO photoinitiator blend | 3% |

TABLE 7

Secondary Coating Found in Fibers 4 and 8

| Component | Trade-name | Company | Description | Wt % or pph |
|---|---|---|---|---|
| Oligomer | BR301 | Bomar | Urethane acrylate oligomer | 45% |
| Difunctional monomer | SR601 | Sartomer | Ethoxylated bisphenol A Diacrylate | 15% |
| Trifunctional monomer | SR492 | Sartomer | Propoxylated trimethylol propane triacrylate | 17% |
| Tetrafunctional monomer | SR494 | Sartomer | Ethoxylated pentaerythritol tetraacrylate | 20% |
| Photoinitiator | Irgacure 1850 | Ciba Specialty Chemicals | BAPO photoinitiator blend | 3% |
| Antioxidant | Irganox 1035 | Ciba Specialty Chemicals | Hindered phenol | 0.5 pph |

TABLE 8

Secondary Coating Found in Fiber 7

| Component | Trade-name | Company | Description | Wt % or pph |
|---|---|---|---|---|
| Oligomer | CN983 | Sartomer | Urethane acrylate oligomer | 60% |
| Trifunctional monomer | SR9020 | Sartomer | Propoxylated glycerol triacrylate | 17% |
| Tetrafunctional monomer | SR295 tetraacrylate | Sartomer | Pentaerythritol | 20% |
| Photoinitiator | Irgacure 1850 | Ciba Specialty Chemicals | BAPO photoinitiator blend | 3% |
| Antioxidant | Irganox 1035 | Ciba Specialty Chemicals | Hindered phenol | 0.5 pph |

What was generally observed was that fibers coated with primary coatings, such as A, that contained only the ethoxylatednonylphenol acrylate monomer residues had pullout values ~1 lb. The addition of various co-monomers seemed to affect the pullout values in some cases. For instance, the incorporation of phenoxyethyl acrylate in the primary coating C of fiber 4 increased the pullout value by approximately 30% relative to fiber 1, which contained the same primary coating A. Other fibers, such as fibers 3 and 5, that contained co-monomers in the primary coatings did not show increases in pullout values relative to fiber 1. In fact, fiber 5 showed a slight decrease in pullout (~19% drop) relative to fiber 1. While the pullout valve was higher, the adhesive strength of the primary coating to the glass surface was apparently not great enough in the case of fiber 4 to prevent primary/glass delaminations.

It had been noticed that combinations of low pullout fibers that contained higher modulus secondary coatings often led to primary/glass delaminations. Fibers 1 and 5, which contained the same secondary coating with a Young's modulus of 402 MPa, showed no delaminations upon fiber inspection. Both fibers 1 and 5 had low pullout values of 0.95 lb and 0.77 lb, respectively. Delaminations were observed in fiber 2, which contained the same primary coating as fiber 1, but had a secondary coating that was 25% higher in modulus (512 MPa) than the fiber 1 secondary coating. Fibers 3 and 4 had much higher modulus secondary coatings than the other fibers shown in Table 3, and both fibers were found to be significantly delaminated. In the case of fiber 3, significant delaminations were not observed on the dry fiber samples, but numerous delaminations were found in the water soaked fibers. Since all of the primary coatings contained the same loading of the 3-mercaptopropyltrimethoxysilane adhesion promoter at 1 pph, it would seem unlikely that the delaminations observed were solely due to failure of the adhesion promoter to affect wet adhesion. One plausible explanation for this behavior was that the primary/glass interaction was weak enough to allow significant delamination to occur during water soak testing but strong enough in the dry state to prevent delaminations that would be observable with the aid of an optical microscope. It is also interesting to note that modulus of the primary coating did not seem to be a factor in delamination resistance. Fiber 3 contained the highest modulus primary coating; however, delaminations were observed in the fiber post water soaking.

When caprolactone acrylate was incorporated into the primary fiber coating E, the pullout values observed in the resulting fibers were significantly higher than values observed for other coating systems (see Table 9).

TABLE 9

Properties of Fibers with Caprolactone Acrylate in Primary Coating

| Fiber # | 6 | 7 | 8 |
|---|---|---|---|
| Primary Coating | E | E | E |
| Primary Monomers[a] | SR504; SR495 | SR504; SR495 | SR504; SR495 |
| Secondary Coating Young's Modulus (MPa) | 402 | 2917 | 1692 |
| 50% Rh Pullout Force (lbf) | 2.58 | 1.41 | 2.03 |
| 95% CL | 0.18 | 0.07 | 0.04 |
| Delaminations? | No | No | No |

[a]SR504 = ethoxylatednonylphenol acrylate; SR495 = caprolactone acrylate.

No delaminations were observed in the fibers listed in Table 9. The major difference between fiber 1 (Table 3) and fiber 6 (Table 9) was that fiber 1 contained only the ethoxylatednonylphenol acrylate monomer in the primary coating, while fiber 6 contained ethoxylatednonylphenol acrylate and caprolactone acrylate. However, the fiber pullout of fiber 6 was nearly three times the fiber pullout of fiber 1 and showed no delaminations. Also, there were differences in pullout values of fiber 4 (Table 3) and fiber 8 (Table 9). The pullout value for fiber 4 was found to be 1.29 lb and the fiber contained numerous primary/glass delaminations, while fiber 8 had a fiber pullout of 2.03 lb and no primary/glass delaminations were observed. Thus, fibers with higher pullout values were more resistant toward delaminations. Fiber 7 was found to have the lowest pullout of the three fibers that contained caprolactone acrylate in the primary coating. Since these fibers contained the same primary coating, although different coating batches, it would appear that the secondary coating may have some influence on the fiber pullout values. This may be related to the internal stress of the coatings. A primary coating in compression would have better adhesion to the glass surface, and would therefore have a higher pullout force in fiber testing.

Example 3

Preparation of Dual-Coated Fibers Without A Monomer With A Pendant Hydroxyl Functional Group Dual-coated fibers were prepared as generally described in Example 1. These coated fibers were then coated with the same secondary coating formulation to form dual-coated fibers 9, 10, and 11 (see Table 10).

TABLE 10

Primary Formulation Compositions for Coatings F-H

| Fiber # | 9 | 10 | 11 |
|---|---|---|---|
| Primary Coating | F | G | H |
| Oligomer(1)-wt % | BR7432-50% | BR3731-52% | BR3731-60% |
| Monomer(1)-wt % | SR504-30% | SR504-25% | SR504-19% |
| Monomer(2)-wt % | SR256-17% | SR506-20% | SR335-19% |
| Photoinitiator-wt % | Irgacure 1850-3% | Irgacure 1850-3% | Irgacure 1850-2% |
| Antioxidant-pph | Irganox 1035-0.5 pph | Irganox 1035-1 pph | Irganox 1035-1 pph |

TABLE 10-continued

Primary Formulation Compositions for Coatings F-H

| Fiber # | 9 | 10 | 11 |
|---|---|---|---|
| Primary Coating | F | G | H |
| Adhesion promoter-pph | 3-mercaptopropyltrimethoxysilane-1 pph | 3-mercaptopropyltrimethoxysilane-1 pph | BIS(trimethoxysilylethyl)benzene-1 pph |

BR7432=aliphatic polyester urethane acrylate oligomer; BR3731=aliphatic urethane acrylate oligomer; SR504=ethoxylatednonylphenol acrylate; SR256=2-(2-ethoxyethoxy)ethyl acrylate; SR506=isobornyl acrylate; SR335=lauryl acrylate; Irgacure1850=BAPO photoinitiator blend; Irganox1035=thiodiethylene bis(3,5-di-tert-butyl-4-hydroxyhydrocinnamate).

None of the coatings contained a monomer with a pendant alcohol functional group. Coating A contained a different oligomer than the other coatings listed (oligomer can also be an important factor in adhesion to glass). Coating C contained a different adhesion promoter than coatings A and B. Adhesion promoter was not expected to significantly influence dry adhesion of primary coating to glass, but was expected to strongly influence adhesion to glass under high humidity environments.

The fiber pullout values for fibers 9, 10, and 11 are shown below in Table 11.

TABLE 11

Properties of Fibers without Caprolactone Acrylate in Primary Coatings

| Fiber # | 9 | 10 | 11 |
|---|---|---|---|
| Primary Coating | F | G | H |
| Primary Monomers[a] | SR504; SR256 | SR504; SR506 | SR504; SR335 |
| Secondary Coating Young's Modulus (MPs) | 402 | 402 | 402 |
| 50% Rh Pullout Force (lbf) | 1.24 | 1.55 | 0.66 |
| 95% CL | 0.08 | 0.19 | 0.10 |
| Delaminations? | No | No | No |

[a]SR504 = ethoxylatednonylphenol acrylate; S256 = 2-(2-ethoxyethoxy) ethyl acrylate; SR506 = isobornyl acrylate; SR335 = lauryl acrylate All three fibers had relatively low pullout values compared to fibers that contained caprolactone acrylate monomer in the primary coating. Fiber 10 had the highest pullout value of 1.55 lb of the three fibers. This fiber should be compared to fibers 1 and 5, which contain the same primary coating oligomer and secondary coating. Since the modulus of the secondary coating of these fibers was quite low, no delaminations were observed. However, if one were to combine a higher modulus secondary coating with these primary coatings, a higher probability of delaminations would be the likely result.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. An optical fiber comprising:
   a glass fiber and
   a primary coating encapsulating and in contact with said glass fiber, said primary coating being the cured product of a polymerizable composition comprising a monomer with a pendant hydroxyl functional group which can bond with a surface of the glass fiber and a co-monomer,
   wherein said monomer with a pendant hydroxyl functional group is present in a concentration of between about 5% and about 40% by weight; and said co-monomer is present in a concentration of between about 10% and about 90% by weight.

2. An optical fiber according to claim 1, wherein said monomer is selected from the group consisting of primary single hydroxyl-containing monomers, secondary or aromatic single hydroxyl-containing monomers, and multiple hydroxyl-containing monomers.

3. An optical fiber according to claim 2, wherein said monomer is a primary single hydroxyl-containing monomer selected from the group consisting of caprolactone(meth)acrylate, 4-hydroxybutyl(meth)acrylate, diethylene glycol mono(meth)acrylate, ethylene glycol mono(meth)acrylate, hydroxymethyl styrene, polyethylene glycol mono(meth)acrylate, polypropylene glycol mono(meth)acrylate, polytetramethylene glycol mono(meth)acrylate, and combinations thereof.

4. An optical fiber according to claim 2, wherein said monomer is a secondary or aromatic single hydroxyl-containing monomer selected from the group consisting of 2-hydroxypropyl(meth)acrylate, 4-hydroxystyrene, and combinations thereof.

5. An optical fiber according to claim 2, wherein said monomer is a multiple hydroxyl-containing monomer selected from the group consisting of hydroxyethylcellulose (meth)acrylate, sorbitol(meth)acrylate, and combinations thereof.

6. An optical fiber according to claim 2, wherein said monomer is caprolactone acrylate.

7. An optical fiber according to claim 1, wherein said optical fiber exhibits fewer than 10 micro-delaminations between said primary coating and said glass fiber, per decimeter of said optical fiber.

8. An optical fiber according to claim 7, wherein said optical fiber exhibits substantially no micro-delaminations between said primary coating and said glass fiber, per decimeter of said optical fiber.

9. An optical fiber according to claim 1, wherein said polymerizable composition further comprises an oligomer capable of being polymerized.

10. An optical fiber according to claim 9, wherein said oligomer is ethylenically unsaturated and present in said polymerizable composition in an amount of about 10 to 90 percent by weight and is selected from the group consisting of a polyether urethane(meth)acrylate oligomer, polyester urethane(meth)acrylate oligomer, polyurea urethane(meth)acrylate oligomer, polyether(meth)acrylate oligomer, polyester(meth)acrylate oligomer, polyurea(meth)acrylate oligomer, epoxy(meth)acrylate oligomer, hydrogenated polybutadiene oligomer, and combinations thereof.

11. An optical fiber according to claim 1, wherein said co-monomer is ethylenically unsaturated and is selected from the group consisting of aliphatic monomers, aromatic monomers, and polar monomers.

12. An optical fiber according to claim 11, wherein said co-monomer is an aliphatic monomer selected from the group consisting of lauryl(meth)acrylate, isooctyl(meth)acrylate, tridecyl(meth)acrylate, isobornyl(meth)acrylate, stearyl(meth)acrylate, isodecyl(meth)acrylate, and combinations thereof.

13. An optical fiber according to claim 11, wherein said co-monomer is an aromatic monomer selected from the group consisting of ethoxylatednonylphenol(meth)acrylate, propoxylatednonylphenol(meth)acrylate, phenoxyethyl (meth)acrylate, phenoxyglycidyl(meth)acrylate, and combinations thereof.

14. An optical fiber according to claim 11, wherein said co-monomer is a polar monomer selected from the group consisting of tetrahydrofurfuryl(meth)acrylate, 2-(2-ethoxyethoxy)ethyl(meth)acrylate, aliphaticoxyglycidyl (meth)acrylate, and combinations thereof.

15. An optical fiber according to claim 1, wherein said glass fiber comprises:
   a glass core and
   a cladding layer encapsulating said glass core.

16. An optical fiber according to claim 1 further comprising:
   at least one secondary coating.

17. An optical fiber according to claim 16, wherein said at least one secondary coating is the cured product of a polymerizable composition that contains urethane(meth)acrylate liquids or ethylenically unsaturated urethane liquids.

18. The optical fiber of claim 16, wherein the at least one secondary coating has a Young's modulus greater than about 402 MPa.

19. The optical fiber of claim 1, wherein a mixture of the monomer with a pendant hydroxyl functional group and the co-monomer has a $T_g$ of less than about 20° C.

20. The optical fiber of claim 1, wherein the polymerizable composition further includes an adhesion promoter.

21. The optical fiber of claim 20, wherein the adhesion promoter is a (meth)acrylate-functional trialkoxysilane.

22. An optical fiber ribbon comprising:
   a plurality of optical fibers according to claim 1 and
   a matrix material encapsulating said plurality of optical fibers.

23. An optical fiber ribbon according to claim 22, wherein said matrix material is selected from the group consisting of polyvinyl chloride and the cured product of a polymerizable composition that contains urethane(meth)acrylate liquids or ethylenically unsaturated urethane liquids.

24. A method of making an optical fiber-comprising:
   providing a glass fiber;
   coating the glass fiber with a polymerizable primary coating composition comprising a monomer with a pendant hydroxyl functional group which can bond with a surface of the glass fiber and a co-monomer,
   wherein said monomer with a pendant hydroxyl functional group is present in a concentration of between about 5% and about 40% by weight; and said co-monomer is present in a concentration of between about 10% and about 90% by weight; and
   polymerizing the composition.

25. A method according to claim 24, wherein said monomer is selected from the group consisting of primary single hydroxyl-containing monomers, secondary single hydroxyl-containing monomers, and multiple hydroxyl-containing monomers.

26. A method according to claim 25, wherein said monomer is a primary single hydroxyl-containing monomer selected from the group consisting of caprolactone(meth)acrylate, 4-hydroxybutyl(meth)acrylate, diethylene glycol mono(meth)acrylate, ethylene glycol mono(meth)acrylate, hydroxymethyl styrene, polyethylene glycol mono(meth)acrylate, polypropylene glycol mono(meth)acrylate, polytetramethylene glycol mono(meth)acrylate, and combinations thereof.

27. A method according to claim 25, wherein said monomer is a secondary single hydroxyl-containing monomer selected from the group consisting of 2-hydroxypropyl (meth)acrylate, 4-hydroxystyrene, and combinations thereof.

28. A method according to claim 25, wherein said monomer is a multiple hydroxyl-containing monomer selected from the group consisting of hydroxyethylcellulose(meth)acrylate, sorbitol(meth)acrylate, and combinations thereof.

29. A method according to claim 25, wherein said monomer is caprolactone acrylate.

30. A method according to claim 24 further comprising:
   coating the glass fiber with a secondary polymerizable composition over the primary polymerizable composition or the primary coating.

31. A method according to claim 30, wherein one or both of the primary and secondary polymerizable compositions are photopolymerizable.

32. A method according to claim 30, wherein said coating the glass fiber with a secondary polymerizable composition is carried out prior to said polymerizing, whereby said polymerizing simultaneously polymerizes the primary polymerizable composition and the secondary polymerizable composition.

33. A method according to claim 30, wherein said coating the glass fiber with a secondary polymerizable composition is carried out after said polymerizing, said method further comprising:
   polymerizing the secondary polymerizable composition after it is applied to the glass fiber.

34. A method according to claim 24, wherein the primary polymerizable composition further comprises an oligomer capable of being polymerized.

35. A method according to claim 34, wherein said oligomer is ethylenically unsaturated and present in the primary polymerizable composition in an amount of about 10 to 90 percent by weight and is selected from a group consisting of a polyether urethane(meth)acrylate oligomer, polyester urethane(meth)acrylate oligomer, polyurea urethane(meth)acrylate oligomer, polyether(meth)acrylate oligomer, polyester(meth)acrylate oligomer, polyurea(meth)acrylate oligomer, epoxy(meth)acrylate oligomer, hydrogenated polybutadiene oligomer, and combinations thereof.

36. A method according to claim 24, wherein said co-monomer is an aliphatic monomer selected from the group consisting of lauryl(meth)acrylate, isooctyl(meth)acrylate, tridecyl(meth)acrylate, isobornyl(meth)acrylate, stearyl(meth)acrylate, isodecyl(meth)acrylate, and combinations thereof.

37. A method according to claim 24, wherein said co-monomer is an aromatic monomer selected from the group consisting of ethoxylatednonylphenol(meth)acrylate, propoxylatednonylphenol(meth)acrylate, phenoxyethyl (meth)acrylate, phenoxyglycidyl(meth)acrylate, and combinations thereof.

38. A method according to claim 24, wherein said co-monomer is a polar monomer selected from the group consisting of tetrahydrofurfuryl(meth)acrylate, 2-(2-ethoxyethoxy)ethyl(meth)acrylate, aliphaticoxyglycidyl (meth)acrylate, and combinations thereof.

39. A method according to claim 24, wherein said glass fiber comprises:
   a glass core and
   a cladding layer encapsulating said glass core.

40. An optical fiber comprising:

a glass fiber;

a primary coating encapsulating and in contact with said glass fiber, said primary coating being the cured product of a polymerizable composition comprising a monomer with a pendant hydroxyl functional group which can bond with a surface of the glass fiber and is present in an amount effective to promote adhesion; and a secondary coating having a Young's modulus of greater than about 402 MPa.

41. An optical fiber according to claim 40, wherein said monomer is selected from the group consisting of primary single hydroxyl-containing monomers, secondary or aromatic single hydroxyl-containing monomers, and multiple hydroxyl-containing monomers.

42. An optical fiber according to claim 41, wherein said monomer is a primary single hydroxyl-containing monomer selected from the group consisting of caprolactone(meth)acrylate, 4-hydroxybutyl(meth)acrylate, diethylene glycolmono(meth)acrylate, ethylene glycol mono(meth)acrylate, hydroxymethyl styrene, polyethylene glycol mono(meth)acrylate, polypropylene glycol mono(meth)acrylate, polytetramethylene glycol mono(meth)acrylate, and combinations thereof.

43. An optical fiber according to claim 41, wherein said monomer is caprolactone acrylate.

44. An optical fiber according to claim 40, wherein said polymerizable composition further comprises an oligomer capable of being polymerized.

45. An optical fiber comprising:

a glass fiber and a primary coating encapsulating and in contact with said glass fiber, said primary coating being the cured product of a polymerizable composition comprising a monomer with a pendant hydroxyl functional group which can bond with a surface of the glass fiber and is present in an amount effective to promote adhesion and a co-monomer, wherein a mixture of said monomer with a pendant hydroxyl functional group and said co-monomer has a $T_g$ comprising no more than about 20° C.

46. The fiber according to claim 45 wherein said $T_g$ comprises no more than about 10° C.

47. An optical fiber according to claim 45, wherein said monomer is selected from the group consisting of primary single hydroxyl-containing monomers, secondary or aromatic single hydroxyl-containing monomers, and multiple hydroxyl-containing monomers.

48. An optical fiber according to claim 47, wherein said monomer is a primary single hydroxyl-containing monomer selected from the group consisting of caprolactone(meth)acrylate, 4-hydroxybutyl(meth)acrylate, diethylene glycol mono(meth)acrylate, ethylene glycol mono(meth)acrylate, hydroxymethyl styrene, polyethylene glycol mono(meth)acrylate, polypropylene glycol mono(meth)acrylate, polytetramethylene glycol mono(meth)acrylate, and combinations thereof.

49. An optical fiber according to claim 47, wherein said monomer is caprolactone acrylate.

50. An optical fiber according to claim 45, wherein said polymerizable composition further comprises an oligomer capable of being polymerized.

51. An optical fiber according to claim 45 further comprising at least one secondary coating, wherein a Young's modulus of at least one of said secondary coatings comprises greater than about 402 MPa.

52. An optical fiber comprising:

a glass fiber and a primary coating encapsulating and in contact with said glass fiber, said primary coating being the cured product of a polymerizable composition comprising a monomer with a pendant hydroxyl functional group which can bond with a surface of the glass fiber and a co-monomer, wherein said monomer with a pendant hydroxyl functional group is present in a concentration of between about 5% and about 40% by weight; and said co-monomer is present in a concentration of between about 10% and about 90% by weight.

* * * * *